United States Patent [19]
Oparin et al.

[11] Patent Number: 5,594,831
[45] Date of Patent: Jan. 14, 1997

[54] BEAM MACHINING DEVICE WITH REFLECTOR COMPRISED OF ARCS OF CONFOCAL ELLIPSES

[75] Inventors: Mikhail I. Oparin; Mikhail T. Borisov; Georgy M. Alexeev, all of Moskva, Russian Federation

[73] Assignees: Nauchno-proizvodstvennay firma "MGM"; Naucho-proizvodstvennaya firma "Adonis", both of Moskovskaya, Russian Federation

[21] Appl. No.: 351,344

[22] Filed: Feb. 16, 1995

[30] Foreign Application Priority Data

Mar. 30, 1993 [RU] Russian Federation ............. 93016355

[51] Int. Cl.$^6$ .................................. G02B 5/10; F21V 7/09
[52] U.S. Cl. .................... 392/421; 250/504 R; 362/297; 362/346; 313/114
[58] Field of Search .................... 392/419–421, 392/422, 424, 412, 413, 415, 430, 431, 411, 416; 219/405, 411, 85.12, 85.13; 250/504 R; 362/297, 302, 304, 346; 313/113, 114

[56] References Cited

U.S. PATENT DOCUMENTS

| | | |
|---|---|---|
| 3,784,836 | 1/1974 | Tolliver ................................. 250/495.1 |
| 3,801,773 | 4/1974 | Matsumi ................................. 392/420 |
| 4,710,638 | 12/1987 | Wood . |

FOREIGN PATENT DOCUMENTS

| | | |
|---|---|---|
| 0286333 | 10/1988 | European Pat. Off. . |
| 645648 | 3/1995 | European Pat. Off. . |
| 653648 | 5/1995 | European Pat. Off. . |
| 3-184287 | 8/1991 | Japan ................................. 392/421 |
| 1081605 | 3/1984 | U.S.S.R. . |
| 1227908 | 4/1986 | U.S.S.R. . |
| 1110073 | 4/1968 | United Kingdom . |
| 1522345 | 8/1978 | United Kingdom . |
| 9409312 | 4/1994 | WIPO . |

*Primary Examiner*—John A. Jeffery
*Attorney, Agent, or Firm*—Gary M. Nath; Nath & Associates

[57] ABSTRACT

A device for beam machining of materials comprising a pin-point source (1) of optical radiation and a concentrating reflector (2) whose reflecting surface has the form of a surface of revolution. The generatrix of said surface of the concentrating reflector (2) is made up of arcs of confocal ellipses (3), lengths of rays (4) emitted from the focus concident with the radiation source (1) and connecting the ends of arcs of ellipses, and arcs of circles (5) with the center in said focus. The size of the boundary segments and their relative arrangement are established on the condition of a most complete collection of the radiation from the pin-point source (1) in the region of the focal point which is coincident with the surface of the machined material, affording a vast possibility of changing the shape of the reflector.

1 Claim, 1 Drawing Sheet

BEAM MACHINING DEVICE WITH REFLECTOR COMPRISED OF ARCS OF CONFOCAL ELLIPSES

FIELD OF ART

The present invention relates to illumination engineering and, more particularly, to technical means for concentration of optical radiation. It can be used in beam machining such as soldering and welding of sheet materials. It will also prove its worth in manufacture and repairs of automobile bodies, in manufacture of metal roofs of buildings and structures and in other fields that rely upon a dependable and safe device for local heating of the surfaces of parts.

PRIOR ART

Devices for concentration of energy of optical radiation have long been utilized for realization of various technological processes involving local surface heating of the machined material.

Known in the prior art is a beam machining device comprising a reflector whose reflecting surface has the shape of an ellipsoid of revolution with an arc source of light installed in one of its foci while its other focus is combined with the surface of the material to be machined (U.S. Pat. No. 3,774,995, Cl.350294, IPC-5:G 02 B 5/10, 1973). One of the disadvantages of this device lies in its large dimensions when it uses powerful light sources. Another known beam machining device comprises a reflector in the form of coaxially and successively installed main and auxiliary ellipsoids interconnected by an annular member. A pin-point light source is disposed in the common radiating focus of said ellipsoids while the surface of the handled material is conjugated with the second focus of the main ellipsoid. A mirror installed between the second focus of the auxiliary ellipsoid and the second focus of the main ellipsoid in the plane perpendicular to the common axis of said ellipsoids directs the radiation reflected by the surface of the auxiliary ellipsoid into the location point of the second focus of the main ellipsoid (laid-open application of FRG No. 3 319 562, OPC-5:F 2IV 7/09, 1984).

The use of a reflector with its surface in the form of an ellipsoid of revolution within an interval from the reflector apex to the point of the radiating focus increases overly the size of the optical radiator in an attempt to increase the distance from the point of radiation to the reflector apex for reducing the thermal load on the reflector walls, said load being inversely proportional to the square of the distance from the point of radiation to the reflector surface. Along with it, the increased thermal load on reflector walls distorts the shape of the reflector which changes its optical properties. This adverse effect can be compensated for by the employment of intensive streams of cooling liquid and by increasing the wall thickness and the weight of the reflector.

DISCLOSURE OF THE INVENTION

The main object of the invention resides in providing a device which will afford an opportunity for using more powerful arc. radiators with simultaneous reduction in size of the concentrating reflector.

The essence of the invention lies in that in the beam machining device comprising a pin-point source of optical radiation and a concentrating reflector whose reflecting surface is a surface of revolution with a generatrix, a part of which is an arc of an ellipse whose larger axis coincides with the axis of revolution, one of its foci is coincident with the radiation source while the other one, with the surface of the material being machined, the surface of revolution of the concentrating reflector has a generatrix made up of the arcs of confocal ellipses, lengths of rays connecting their ends and emitted from the focus which is coincident with the radiation source, and of arcs of circles with the center in this focus; the dimensions of generatrix segments and their relative arrangement are set so that any straight line passing through the point coincident with the radiation source and intersecting the reflector surface on the segment with the generatrix in the form of an arc of the circle also intersects the reflector surface on the segment with the generatrix in the form of an arc of the ellipse, while any straight line passing through the focal point coincident with the surface of the material being machined has only one point of intersection with the reflecting surface of the concentrating reflector; the number of ellipse arcs k of the generatrix, the number of lengths of rays n, and the number of circle arcs m are interrelated by the relationship k=n+m+1 where n and m are whole numbers: n,m–0, 1, 2 . . . .

Such a realization of the reflecting surface of the concentrating reflector does not interfere with the general principle of building up the optical system of the device consisting in that radiation of a pin-point light source disposed in the first local point of the reflector whose surface has the form of an ellipsoid of revolution is concentrated in its second focal point. The use of a system of successively positioned reflecting layers in the form of ellipsoids of revolution with coincident focal points is equivalent to the use of a reflecting surface with one ellipsoid. Joining of the adjacent reflecting segments by the segments of conical surfaces which are coaxial with the elliptical ones, the apex of the cone being coincident with the first common focus of reflecting ellipsoids, permits avoiding reflection from the nonelliptical parts of the reflector. The use of reflecting segments of the reflector surface in the form of a spherical layer with the center of the sphere in the first focal point helps substantially in modifying the shape of the reflector, changing it to suit the particular requirements of the technological process. After being reflected from the surface of the sphere the radiation of the light source must fall on the elliptical segment of the reflector with subsequent concentration in the point of the second focus. It is evident that, after being reflected from the elliptical reflecting surface, radiation must not be intercepted by the conical or spherical surfaces on the way to the second focal point which is coincident with the surface of the material being machined. The realization of the concentrating reflector in the form of a succession of segments with elliptical, conical and spherical reflecting surfaces makes it possible, firstly, to increase substantially the distance from the radiation source to the reflector surface which will reduce considerably the thermal load on the reflector surface and, secondly, to change considerably the shape of the reflecting surface, thus adapting to the requirements of the technological process. Thus, the disclosed technical solution permits increasing the power of the used light source even with simultaneous reduction of the size of the device within reasonable limits.

BRIEF DESCRIPTION OF THE DRAWINGS

Now the invention will be described in detail with reference to the drawing in the FIGURE showing an embodiment of the beam machining device.

EMBODIMENTS OF THE INVENTION

Figure 1:
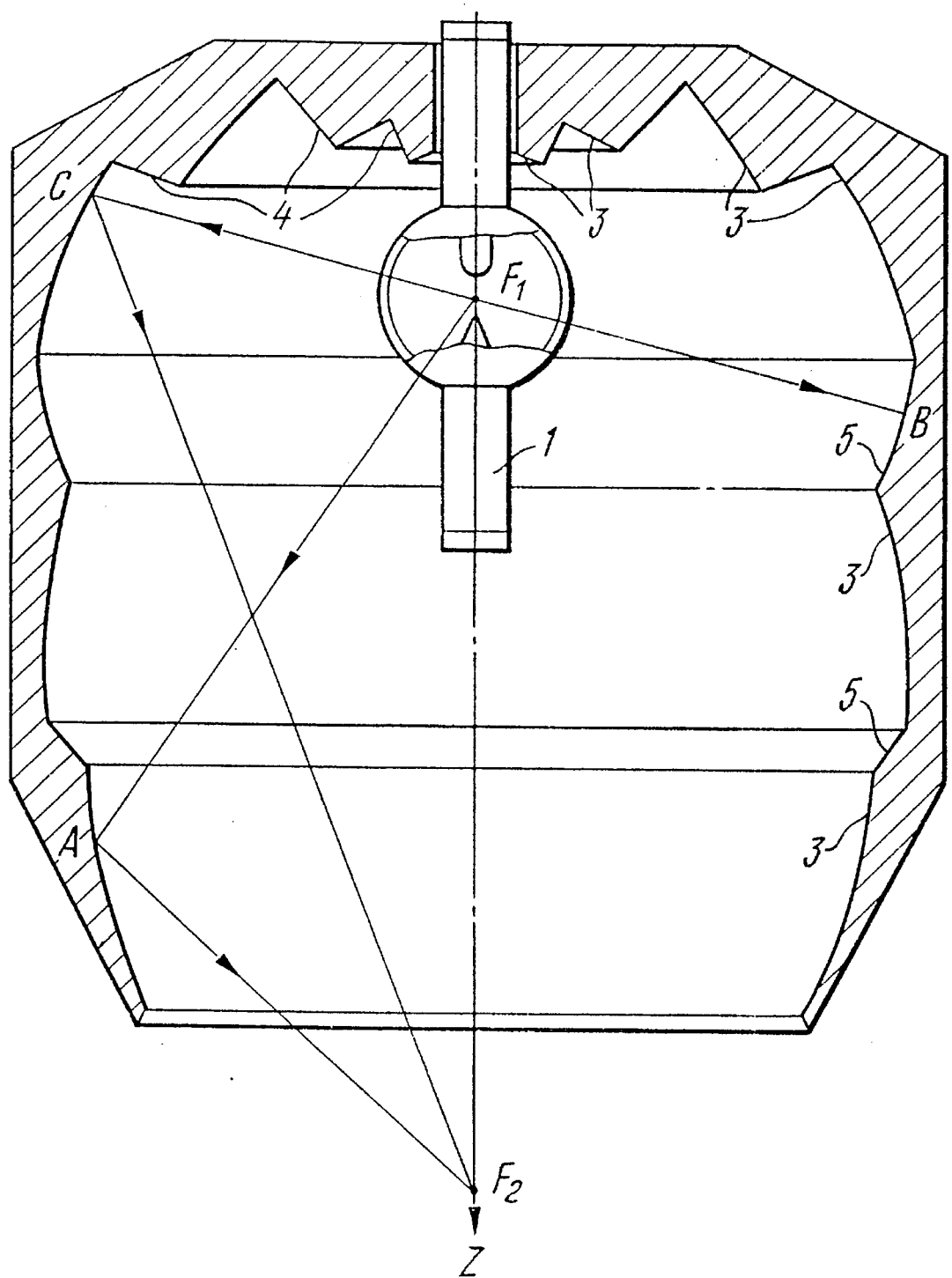

The optical radiator comprises a radiation source 1 with a pin-point radiating region disposed in point F1 on the axis of a concentrating reflector 2 whose reflecting surface is produced by revolving a zigzag line made up of arcs of ellipses 3 with their foci in points F1 and F2, lengths of rays 4 emitted from point F1, and arcs of circles 5 with their center in point F1, around the axis passing through points F1 and F2.

The device functions as follows. Radiation of the source 1 extending along the rays from point F1 is reflected by the surface of the concentrating reflector 2. If said reflection takes place on the segment of the surface with the generatrix in the form of an arc of ellipse 3 with the foci in points F1 and F2 then, after reflection, the radiation is directed along the ray passing through point F2. In the FIGURE this is represented by the longths (F1,A) and (A,F2). If reflection occurs on the segment of the surface with its generatrix in the form of an arc of circle 5 with its center in point F1, then after reflection said radiation again passes through point F1 and is propagated to the point of intersection with the reflector surface on the segment whose generatrix has the form of an arc of ellipse 3. This corresponds to the travel of the ray along lengths (F1, B) and (B, F1, C) . If point C of the generatrix of the surface of revolution of the concentrating reflector also belongs to the arc of the circle 5, said radiation will pass repeatedly along the path (B, C), (C, B) without coming to the local point F2. Such a segment of the reflector will not contribute to the flow of radiation passing through the section in which the surface of the treated material is installed. Therefore, this case must be canceled from the probable embodiments of the reflector.

Inasmuch as the direction of propagation of radiation coincides with the rays emitted from point F1, there will be no reflection of radiation from the segments of the reflector surface with the generatrix in the form of segments of rays 4 and these segments will exert no influence on propagation of radiation if they do not happen to get in the way of radiation reflected from the elliptical segments. Such obstacles which may also be created by the reflector segments with their generatrices in the form of the arcs of circles 5 must not be allowed in the embodiment of the reflector.

The surface of the concentrating reflector 2 with its generatrix in the form of a zigzag line with segments of arcs of ellipses 3, arcs of circles 5 or lengths of rays 4 makes it possible to change substantially the shape of the reflector to suit particular conditions. Thus, a higher utilization coefficient of radiation can be obtained by reduction the diameter of reflector output section and bringing it closer to the focal point F2. In a limiting case when the plane of output aperture coincides with the section plane passing through point F2, the angle of radiation utilization is determined by the equation:

$$\alpha = \pi + 2 \, arctg \, (a^2/b^2 - 1)^{1/2},$$

where a—length of larger half-axis of ellipse and b—length of its smaller half-axis. If a/b=2, $\alpha \cong 1.66\pi$ radian, while if a/b=3, $\alpha = 1.83\pi$ radian.

The above-described design of the concentrating reflector 2 provides for a considerable reduction of thermal load applied to the reflector walls which permits decreasing their thickness, reducing the weight and size of the radiator or increasing the power of the optical radiation source.

Commercial Applicability

The disclosed technical solution increases the power of the light sources in the beam machining device and reduces its weight and size. This, in turn, broadens the field of utilization of said device. It can be widely employed in various branches of industry, civil engineering and transport, e.g. in automotive industry or agricultural engineering for welding of sheet articles, repairing automobile bodies, constructing and repairing metal roofs of buildings, etc.

We claim:

1. A beam machining device comprising a pin-point source of optical radiation and a concentrating reflector whose reflecting surface has the form of a surface of revolution with a generatrix constituted partly by an arc of an ellipse whose larger axis is coincident with the axis of rotation, one of its foci is coincident with the radiation source while the other one, with the surface of the material being machined characterized in that the surface of revolution of the concentrating reflector has a generatrix made up of the arcs of confocal ellipses, lengths of rays interconnecting the ends of said arcs and emitted from the focus coincident with the source of radiation, and of the arcs of circles with the center in said focus, the size of the generatrix segments and their relative positioning being selected so that any straight line passing through the point coincident with the radiation source and intersecting the reflector surface on the segment with the generatrix in the form of an arc of a circle intersects the reflector surface, and on the segment with the generatrix in the form of an arc of an ellipse any straight line passing through the focal point coincident with the surface of the machined material has only one point of intersection with the reflecting surface of the concentrating reflector while the number of arcs of generatrix ellipses k, the number of lengths of rays n and the number of arcs of circles m are interrelated by a relationship k=n+m+1 where n and m are whole numbers, n, m=0, 1, 2 . . . .

* * * * *